(12) United States Patent
Franke et al.

(10) Patent No.: US 9,611,176 B2
(45) Date of Patent: Apr. 4, 2017

(54) SETTING ACCELERATOR FOR A DRY MORTAR BLEND, PROCESS FOR PRODUCING SUCH A SETTING ACCELERATOR, A DRY MORTAR BLEND AND A MORTAR PASTE

(71) Applicant: YARA INTERNATIONAL ASA, Oslo (NO)

(72) Inventors: Wolfram Franke, Porsgrunn (NO); Anne Mette Langholm, Oslo (NO); Hilde Brekke Dahl Thommesen, Stathelle (NO); Bjørn Helge Engesveen, Oslo (NO)

(73) Assignee: YARA INTERNATIONAL ASA, Oslo (NO)

( * ) Notice: Subject to any disclaimer, the term of this patent is extended or adjusted under 35 U.S.C. 154(b) by 0 days.

(21) Appl. No.: 15/033,956

(22) PCT Filed: Nov. 4, 2014

(86) PCT No.: PCT/EP2014/073646
§ 371 (c)(1),
(2) Date: May 3, 2016

(87) PCT Pub. No.: WO2015/067588
PCT Pub. Date: May 14, 2015

(65) Prior Publication Data
US 2016/0280597 A1   Sep. 29, 2016

(30) Foreign Application Priority Data
Nov. 5, 2013   (NO) .................................. 20131471

(51) Int. Cl.
| | | |
|---|---|---|
| *C04B 22/08* | (2006.01) | |
| *C04B 28/02* | (2006.01) | |
| *C04B 40/00* | (2006.01) | |
| *C01F 11/36* | (2006.01) | |
| *C04B 28/04* | (2006.01) | |
| *C04B 103/12* | (2006.01) | |

(52) U.S. Cl.
CPC ............ *C04B 22/085* (2013.01); *C01F 11/36* (2013.01); *C04B 28/02* (2013.01); *C04B 28/04* (2013.01); *C04B 40/0042* (2013.01); *C04B 2103/12* (2013.01)

(58) Field of Classification Search
CPC ..... C04B 28/02; C04B 28/04; C04B 20/0076; C04B 20/026; C04B 20/04; C04B 22/085; C04B 40/0042; C04B 40/0608; C04B 2103/12; C01F 11/36
See application file for complete search history.

(56) References Cited

U.S. PATENT DOCUMENTS

| | | | |
|---|---|---|---|
| 2,375,898 A | 5/1945 | De Bruljn et al. | |
| 4,747,877 A | 5/1988 | Braun | |
| 5,211,751 A * | 5/1993 | Arfaei ................... | C04B 24/123 106/727 |
| 6,610,267 B1 | 8/2003 | Obrestad et al. | |
| 7,500,995 B2 * | 3/2009 | Isaksen ................... | C01B 21/48 23/295 R |
| 2009/0189117 A1 | 7/2009 | Bewsey | |

FOREIGN PATENT DOCUMENTS

| | | |
|---|---|---|
| DE | 3543874 A1 | 6/1987 |
| DE | 102007038403 A1 | 2/2009 |
| EP | 0 537 872 A1 * | 4/1993 |
| GB | 678404 A | 9/1952 |
| WO | 0002831 A1 | 1/2000 |
| WO | 0206182 A1 | 1/2002 |
| WO | 2007012951 A1 | 2/2007 |
| WO | 2010018017 A2 | 2/2010 |
| WO | 2014048870 A1 | 4/2014 |

OTHER PUBLICATIONS

PCT International Search Report and Written Opinion dated Jan. 22, 2015 for PCT International Patent Application No. PCT/EP2014/073646, 11 pages.

* cited by examiner

*Primary Examiner* — Anthony J Green
(74) *Attorney, Agent, or Firm* — Amster, Rothstein & Ebenstein LLP

(57) ABSTRACT

The invention relates to a setting accelerator for a dry mortar blend, the setting accelerator being in the form of a powder comprising calcium nitrate and having a water content between 0.1% and 20%. The invention furthermore relates to a process for producing such a setting accelerator, wherein either prills and/or granules comprising calcium nitrate and a different nitrate salt are processed forming a powder comprising calcium nitrate and the different nitrate salt and having a water content of higher than 5% and lower than 20%, either an aqueous solution at least comprising dissolved calcium nitrate is spray dried at a temperature between 150° C. and 250° C., forming a powder comprising at least calcium nitrate and having a water content between 0.1% and 20%, the powder serving as the setting accelerator. The invention also relates to a dry mortar blend comprising at least a cement, sand and a setting accelerator according to the invention and to a mortar paste comprising the dry mortar blend according to the invention which is mixed with water.

19 Claims, 2 Drawing Sheets

SETTING ACCELERATOR FOR A DRY MORTAR BLEND, PROCESS FOR PRODUCING SUCH A SETTING ACCELERATOR, A DRY MORTAR BLEND AND A MORTAR PASTE

CROSS-REFERENCE TO RELATED APPLICATIONS

This application is a U.S. national stage entry under 35 U.S.C. §371 of PCT International Patent Application No. PCT/EP2014/073646, filed Nov. 4, 2014, which claims priority to Norwegian Patent Application No. 20131471, filed Nov. 5, 2013, the contents of which are incorporated herein by reference in their entirety.

FIELD OF THE INVENTION

The invention relates to a setting accelerator for a dry mortar blend, the dry mortar blend comprising calcium nitrate. The invention furthermore relates to a process for producing such a setting accelerator. The invention also relates to a dry mortar blend comprising such a setting accelerator, and to a mortar paste comprising such a dry mortar blend which is mixed with water.

BACKGROUND OF THE INVENTION

A dry mortar blend is mixed with water to make a workable mortar paste which is useful as a common construction material to bind construction blocks together and fill the gaps between them. A mortar paste becomes hard when it sets, resulting in a rigid aggregate structure. Mortar can also be used to fix, or point, masonry when the original mortar has washed away.

Present-day dry mortar blends are typically made from a mixture of an aggregate such as sand, a binder such as cement or lime, and water. Commonly, a dry mortar blend consists of about 25% of cement and of about 75% of sand. Just before use, the dry mortar blend is mixed with water. The dry mortar blend is stored dry in bags.

Cement is thus used as the binder material that hardens to form the connecting material between solids. Cements that are used in construction are either hydraulic or non-hydraulic. Hydraulic cements (e.g., Portland cement) harden because of hydration, being a chemical reaction between anhydrous cement powder and water.

Consequently, they can harden underwater or when constantly exposed to wet weather. The chemical reaction results in hydrates that are not very water-soluble and so are quite durable in water. Non-hydraulic cements do not harden underwater. Slaked limes for example harden by reaction with atmospheric carbon dioxide.

Portland cement is by far the most common type of cement in general use around the world. This cement is made by heating limestone (calcium carbonate) with small quantities of other materials (such as clay) to a temperature of 1450° C. in a kiln, in a process known as calcination. In a calcination process, a molecule of carbon dioxide is liberated from the calcium carbonate to form calcium oxide, also called quicklime, which is then blended with the other materials that have been included in the mix. The resulting hard substance, called 'clinker', is then ground with a small amount of gypsum into a powder to make 'Ordinary Portland Cement', the most commonly used type of cement (often referred to as OPC).

There exist different types of cement, indicated with CEM I to CEM V, with a lower or higher content of Portland cement and high oven cement, i.e.

CEM I: OPC with maximally 5% of other compounds;
CEM II: all kinds of mixtures of OPC and for instance slate, minimally 65% OPC;
CEM III: high oven/Portland cement mixture in 3 classes: A, B and C, wherein CEM III/A comprises the lowest (40%) and CEM III/C the highest (60%) amount of blast furnace slag;
CEM IV: types of Pozzolana cement;
CEM V: composite cements, with mixtures of OPC, blast furnace slag and Pozzolana compounds.

Depending on the climate and the application, a setting accelerator is needed. For instance, in cold weather conditions, it can be beneficial to use a setting accelerator to have a setting time reduction to prevent undercooling and loss of strength and durability.

Until now, the most commonly used setting accelerator is calcium formate ($Ca(HCOO)_2$). Calcium formate is a non-hygroscopic powder that shows good response with Ordinary Portland Cement (OPC). The disadvantage of calcium formate however is that it shows a weak response on the more and more popular blended cements like CEM II/A-V. In addition, calcium formate is quite an expensive calcium salt.

Calcium chloride ($CaCl_2$), which is the most cost efficient calcium salt, can also be used as a setting accelerator. Mortar based structures however are often reinforced with metal pieces to keep the mortar in shape during production. In case of reinforcement, the disadvantage when using chlorides is that these chlorides are leading to metal corrosion, through which the expansion of the formed "rust" leads to volume expansion and cracking of the mortar. This has as a consequence that the durability of the mortar made reinforced element is reduced.

It is also possible to use lithium carbonate ($Li_2CO_3$). The disadvantage of using carbonate however is that it reduces the pH value of the mortar and that consequently, it can give harm to embedded reinforcement.

There are approaches to use hardening accelerators instead of setting accelerators. Common types are sodium thiocyanate, triisopropanolamine (TIPA) or triethanolamine (TEA). These substances lead to increased intensity of reactions what also results in earlier finishing of the setting period. However, as a matter of fact, those hardening accelerators are hazardous substances. Therefore, such substances can hardly be used with respect to the environment as well as with respect to the user thereof.

Calcium nitrate ($Ca(NO_3)_2$) is commonly used as a concrete admixture, usually in the form of a solution. The final liquid product for end users is prepared from either a solution or a dissolved powder, granules or prills. Calcium nitrate shows a good response on most blended cement types and is a common admixture for concrete. Usually 1% to 2% calcium nitrate needs to be added by weight of cement (=bwoc).

In WO 2002006182, it is described to use particulate cellulose material such as untreated rice husks to extend hydraulic cement compositions. In order to overcome the problem that the untreated rice husks do not bind well with wetted cement compositions, an accelerator or setting is added to the cement mixture. In the description, it is stated that good results are obtained with calcium nitrate. However, no further details are given in which form and what concentration the calcium nitrate is added to the cement.

Calcium nitrate powder is commonly found as a tetrahydrate. With more than 30% of crystal water, calcium nitrate salt is wet. As a result, when this tetrahydrate calcium nitrate powder is blended with cements, the blend clogs. Furthermore, calcium nitrate granules and prills cannot be directly used in mortar, since granules that are added to water, together with cement and sand, do not dissolve in the water because the sand and the cement consume the water and because of their low affinity towards water. The amount of remaining free water is too low to dissolve the calcium nitrate granules, and the concentration of calcium nitrate is too high so that it finally precipitates.

The calcium ammonium nitrate complex salt (ammonium nitrate:calcium nitrate:water in the ratio 1:5:10) has been used in crushed form in this application.

However, the dosage of 1% to 2% of cement weight and the generally high content of cement in mortar leads to ammonia emissions that can already exceed the odour threshold, i.e. 5-50 parts per million (ppm) of air.

Therefore, there exists the need to provide a dry mortar blend comprising calcium nitrate which does not clog or cake and in which the calcium nitrate does not precipitates when being mixed with water. A further need is to provide a dry mortar blend which is odour free when being processed.

SUMMARY OF THE INVENTION

According to a first aspect of the invention, a setting accelerator is provided for a dry mortar blend, the setting accelerator comprising calcium nitrate, wherein the setting accelerator is in the form of a powder at least comprising calcium nitrate and having a water content between 0.1% and 20%.

A powder is a dry, bulk solid composed of a large number of very fine particles that may flow freely when shaken or tilted.

If the setting accelerator according to the invention is mixed with an aggregate, a binder and other possible compounds to form a dry mortar blend, when this dry mortar blend is consequently mixed with water, no caking or clogging occurs since powder particles are small enough to dissolve in the remaining water. Furthermore, such a setting accelerator according to the invention takes care that, when it is used in a dry mortar blend, when this dry mortar blend is being processed, no odour is released.

In a possible embodiment of a setting accelerator according to the invention, the powder is an anhydrous calcium nitrate powder having a water content between 0.1% and 5%. It has surprisingly been found that, when using such an anhydrous calcium nitrate powder as the setting accelerator in a dry mortar blend, setting acceleration of the mortar paste being the mixture of the dry mortar blend with water occurs even better due to the exothermic effect of the dissolution of this anhydrous calcium nitrate powder in the remaining water (=water which is not taken up by the aggregate and the binder).

In another possible embodiment of a setting accelerator according to the invention, the powder comprises calcium nitrate and at least a different nitrate salt, and has a water content of higher than 5% and lower than 20%, more preferably between 16% and 20%.

The different nitrate salt preferably is potassium nitrate.

More preferably, the powder consists of 75 weight % to 80 weight % of calcium nitrate and 7 weight % to 11 weight % of potassium nitrate.

The powder most preferably is formed out of a salt complex of calcium nitrate and potassium nitrate as described in more detail in WO 00/02831 in the name of Norsk Hydro ASA (which is herein incorporated by reference) is used here. The advantage thereof is that this salt complex is not very hygroscopic.

In a preferred embodiment of a setting accelerator for a dry mortar blend according to the invention, the powder has a particle size of 0.1 mm to 1 mm.

According to a further aspect of the invention, a process is disclosed for producing a setting accelerator according to the invention as described above, the process comprising the step of processing prills and/or granules comprising calcium nitrate and at least a different nitrate salt, into a powder comprising calcium nitrate and at least the different nitrate salt and having a water content higher than 5% and lower than 20%, the powder serving as the setting accelerator.

In a preferred embodiment of a process according to the invention, the prills and/or granules are processed at a temperature between 10° C. and 40° C.

In a favorable embodiment of a process according to the invention, the prills and/or granules are processed at a relative humidity of between 1% and 45%, more preferably between 1% and 40%.

In a first possible embodiment of a process according to the invention, the prills and/or granules are cutted forming the powder. In this way, the prills and/or granules are only locally exposed to pressure, through which heat release is reduced, which is advantageous for the powder since heat stimulates clogging.

The prills and/or granules are preferably cutted using rotating blades.

In another possible embodiment of a process according to the invention, the prills and/or granules are grinded forming the powder.

According to another aspect of the invention, a process for producing a setting accelerator according to the invention as described above is disclosed, the setting accelerator comprising calcium nitrate, wherein the process comprises the step of spray drying an aqueous solution at least comprising dissolved calcium nitrate, at a temperature between 150° C. and 250° C., forming a powder at least comprising calcium nitrate and having a water content between 0.1% and 20%, the powder serving as the setting accelerator.

In a possible embodiment of a process according to the invention, the process comprises the step of spray drying an aqueous calcium nitrate solution at a temperature between 150° C. and 250° C., obtaining an anhydrous calcium nitrate powder having a water content between 0.1% and 5%, the powder serving as the setting accelerator.

In another possible embodiment of a process according to the invention, the process comprises the step of spray drying an aqueous solution comprising dissolved calcium nitrate and at least a different dissolved nitrate salt, at a temperature between 150° and 250° C., obtaining a powder comprising calcium nitrate and at least the different nitrate salt and having a water content higher than 5% and lower than 20%, the powder serving as the setting accelerator.

The different dissolved nitrate salt preferably is dissolved potassium nitrate.

The aqueous solution preferably comprises 50% by weight of dissolved calcium nitrate.

The invention also relates to a dry mortar blend comprising at least a binder, an aggregate and a setting accelerator according to the invention as described above.

More preferably, the dry mortar blend comprises a ratio of powder to cement of 0.005 to 0.1.

Preferably, the dry mortar blend comprises a ratio of aggregate to cement of between 2 and 4.

The invention furthermore relates to a mortar paste comprising a dry mortar blend according to the invention as described above, the mortar paste comprising a ratio of water to binder of 0.4 to 0.8.

DETAILED DESCRIPTION OF THE INVENTION

Figure 1:
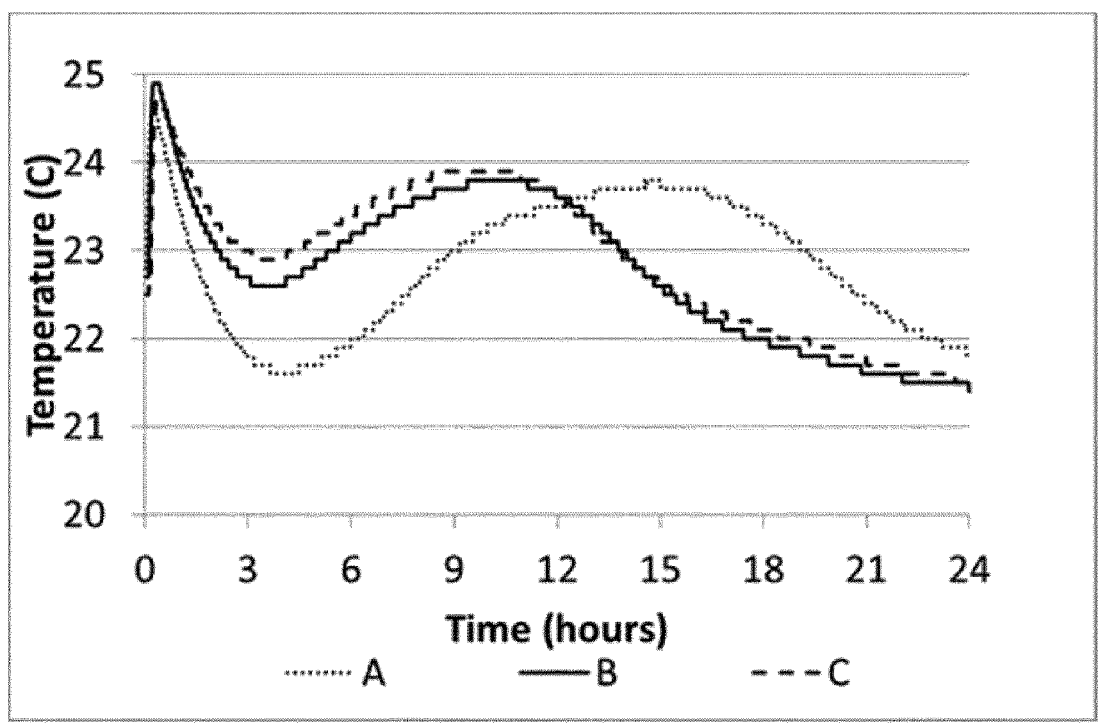
FIG. 1 shows a graph representing the hydration temperature (in ° C.) in function of the time (in hours) of the three samples as described in example 1.

A setting accelerator for a dry mortar blend according to the invention is in the form of a powder at least comprising calcium nitrate having a water content between 0.1% and 20%. Such a powder can be produced in different ways.

A first possibility to form the powder is to process prills and/or granules formed out of a salt complex of calcium nitrate and at least a different nitrate salt, this different nitrate salt preferably being potassium nitrate. The salt complex therewith preferably consists out of 75 weight % to 80 weight % of calcium nitrate and 7 weight % to 11 weight % of potassium nitrate. These prills and/or granules as mentioned above preferably are cutted, more preferably using rotating blades, or grinded forming the powder. This cutting or grinding of the prills and/or granules is preferably performed at a temperature between 10° C. and 40° C., and preferably at a relative humidity of between 1% and 45%. This process leads to a powder having a water content higher than 5% and lower than 20%, more preferably between 16% and 20%.

Another possibility to form the powder is to spray dry an aqueous solution comprising at least dissolved calcium nitrate at a temperature between 150° C. and 250° C. The aqueous solution is then injected via a nozzle into a hot air stream with a temperature of between 150° C. and 250° C.

It is therewith possible to spray dry an aqueous calcium nitrate solution (only consisting of calcium nitrate that is dissolved in water). In this way, an anhydrous calcium nitrate powder is obtained having a water content between 0.1% and 5%.

Another possibility is to spray dry an aqueous solution having dissolved calcium nitrate and another dissolved nitrate salt, preferably a dissolved potassium nitrate salt. In this way, a powder is obtained comprising calcium nitrate and at least a different nitrate salt, preferably potassium nitrate salt, the powder having a water content higher than 5% and lower than 20%, more preferably between 16% and 20%.

In both cases, the aqueous solution preferably comprises 50% by weight of calcium nitrate.

The powder resulting out of the abovementioned processes preferably has a particle size of 0.1 mm to 1 mm.

In order to obtain a dry mortar blend, the powder according to the invention as described above is first of all blended with a binder, preferably cement. About 0.5% to 2% bwoc of the powder according to the invention is added. Furthermore, an aggregate, preferably sand, is added. This dry mortar blend can be stored in bags for several weeks.

It is observed that, when mixing the produced dry mortar blend to which the powder according to the invention as a setting accelerator is added with water to form a mortar paste, shows the same performance as the conventional mortars to which a calcium nitrate powder (solely comprising calcium nitrate) has been added as a setting accelerator while mixing with water.

EXAMPLES

Example 1

Three samples of a mortar paste were produced, i.e.
an untreated sample (A) consisting of an untreated dry mortar blend consisting of an aggregate and a binder which are mixed with water. No setting accelerator is added while mixing with water;
a conventional sample (B) consisting of a dry mortar blend consisting of an aggregate and a binder which are mixed with water. During mixing with water, 2% bwoc of calcium nitrate is added as a setting accelerator;
a sample of a mortar paste according to the invention (C) comprising a dry mortar blend according to the invention consisting of an aggregate and a binder which are mixed with water. During mixing with water, 2% bwoc of a powder according to the invention is added as a setting accelerator. This powder was produced out of Yara NitCal® K granules, being a technical grade nitric acid, calcium potassium salt. The chemical composition of this complex salt is $KNO_3:Ca(NO_3)_2:H_2$ in a ratio of 1:5:10. The Yara NitCal® K granules were crushed in a lab scale crusher based on a rotating knives principle. The resulting powder has a particle size of approximately 0.01 to 0.1 mm.

All dry mortar blends of the three samples (A-C) were prepared using cement as the binder and standard sand as the aggregate. The applied ratio of water/cement was 0.5 and the applied ratio of sand to cement was 3.

The sample size was 500 ml each. The samples of the dry mortar blend according to the invention were stored on benches at a temperature of circa 20° C. for up to 2 months.

The hydration of the abovementioned samples (A-C) was measured via the temperature development while the hydration took place. To measure the hydration temperature, a PT-100 type sensor, which is a commonly used temperature sensor, was used. For logging the temperature data, an E+H (Endress+Hauser) Memograph M, i.e. a device that specifically has been designed to save a variety of diverging process parameters, was used.

The performance tests were evaluated after several weeks. In FIG. 1, the results of the hydration temperature in function of the time in hours for a 2 weeks shelf storage time are given as an example. When looking at this graph as shown in FIG. 1, it is observed that the sample according to the invention (C) leads to comparable results as the conventional sample (B). Both samples (B & C) show an earlier setting compared to the untreated sample (A), or in other words the hydration performance of both samples (B & C) is higher than the one of the untreated sample (A).

Example 2

In a laboratory mixer, Yara NitCal® K granules were cut. The sample was then segregated by particle size, and the following classes were formed:
>2 mm;
1-2 mm;

0.5-1 mm;
0.1-0.5 mm;
<0.1 mm.

Figure 2:
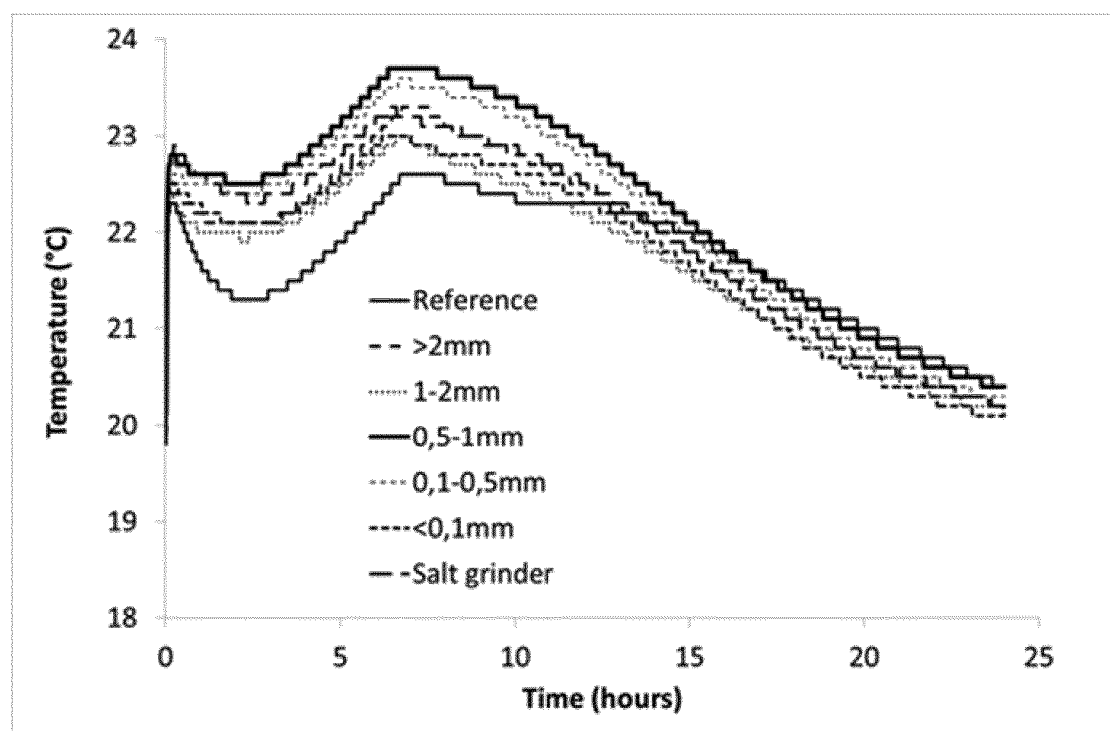
FIG. 2 shows a graph representing the hydration temperature (in ° C.) in function of the time (in hours) of samples having a different sized material.

Two different types of cement, i.e. CEM I 42.5R and CEM II/A-V 42.5, were used separately. Dry mortar blend samples of 500 ml size and with a ratio w/c of 0.65 were prepared. 1.5% bwoc of the powder according to the invention was added. The curing temperature was 5° C. and 20° C. As can be seen in FIG. 2, the tests indicated that the powder according to the invention with a particle size of 0.1 mm to 1 mm performed best, while powders according to the invention with a bigger particle size and a smaller particle size do not seem to perform as well.

The invention claimed is:

1. A method for reducing the setting time of a mortar paste comprising the step of introducing a setting accelerator in a dry mortar blend, wherein the setting accelerator is in the form of a powder comprising calcium nitrate, wherein the powder has a water content between 0.1% by weight and 20% by weight and a particle size of 0.1 mm to 1 mm; and wherein upon mixing the dry mortar blend comprising the setting accelerator with water to make the mortar paste the setting time of the mortar paste is reduced.

2. The method according to claim 1, wherein the powder is an anhydrous calcium nitrate powder having a water content between 0.1% by weight and 5% by weight.

3. The method according to claim 1, wherein the powder comprises calcium nitrate and at least a different nitrate salt, the powder having a water content higher than 5% by weight and lower than 20% by weight.

4. The method according to claim 3, wherein the different nitrate salt is potassium nitrate.

5. The method according to claim 3, wherein the powder comprises 75 weight % to 80 weight % of calcium nitrate and 7 weight % to 11 weight % of potassium nitrate.

6. The method according to claim 3, wherein the powder comprises a complex salt of calcium nitrate, potassium nitrate and water.

7. The method according to claim 1, wherein the dry mortar blend comprising the setting accelerator does not clog nor cake and wherein the calcium nitrate in the dry mortar blend, upon mixing with water, does not precipitate.

8. Process for producing a setting accelerator for a dry mortar blend, the setting accelerator in the form of a powder comprising calcium nitrate, wherein the process comprises the step of cutting or grinding prills and/or granules comprising calcium nitrate and at least a different nitrate salt into a powder, wherein said powder serves as the setting accelerator and has a water content higher than 5% by weight and lower than 20% by weight and a particle size of 0.1 mm to 1 mm.

9. Process according to claim 8, wherein the prills and/or granules are cut or grinded at a temperature between 10° C. and 40° C.

10. Process according to claim 8, wherein the prills and/or granules are cut or grinded at a relative humidity of between 1% and 45%.

11. Process according to claim 8, wherein the prills and/or granules are cut using rotating blades.

12. Process for producing a setting accelerator for a dry mortar blend, the setting accelerator in the form of a powder comprising calcium nitrate, wherein the process comprises the step of spray drying an aqueous solution at least comprising dissolved calcium nitrate, at a temperature between 150° C. and 250° C., into a powder, wherein said powder serves as the setting accelerator and has a water content between 0.1% by weight and 20% by weight and a particle size of 0.1 mm to 1 mm.

13. Process according to claim 12, wherein the setting accelerator in the form of a powder comprising calcium nitrate has a water content between 0.1% by weight and 5% by weight.

14. Process according to claim 12, wherein the aqueous solution comprises dissolved calcium nitrate and at least a different dissolved nitrate salt, and the setting accelerator in the form of a powder comprising calcium nitrate having a water content higher than 5% by weight and lower than 20% by weight.

15. Process according to claim 12, wherein the aqueous solution comprises 50% by weight of dissolved calcium nitrate.

16. Dry mortar blend comprising at least a binder, an aggregate and a setting accelerator, wherein the setting accelerator is a powder comprising calcium nitrate and having a water content between 0.1% by weight and 20% by weight and a particle size of 0.1 mm to 1 mm.

17. Dry mortar blend according to claim 16, wherein the dry mortar blend comprises a weight ratio of powder to binder of 0.005 to 0.05.

18. Dry mortar blend according to claim 16, wherein the dry mortar blend comprises a weight ratio of aggregate to binder of between 2 and 4.

19. Dry mortar blend according to claim 16, wherein, the dry mortar blend comprising the setting accelerator does not clog nor cake and wherein, upon mixing the dry mortar blend with water, the calcium nitrate does not precipitate.

* * * * *